July 1, 1952     A. JENSEN     2,601,973
LAYERED ELEMENT FOR HEAT TRANSFER CORE
Filed June 25, 1949
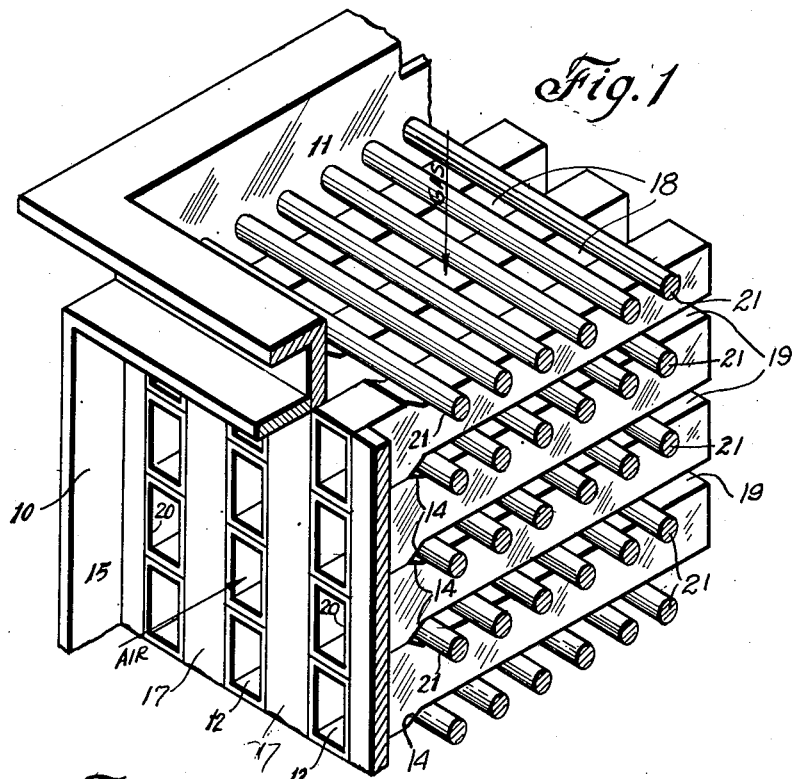
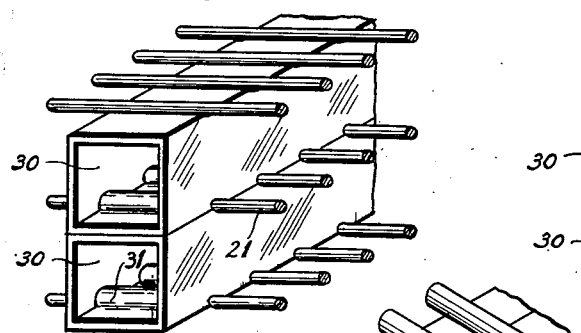
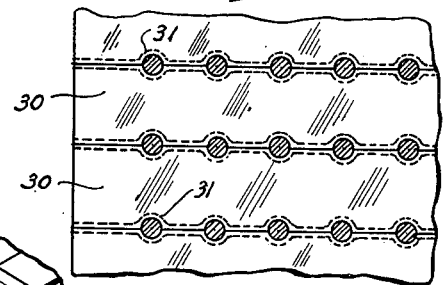
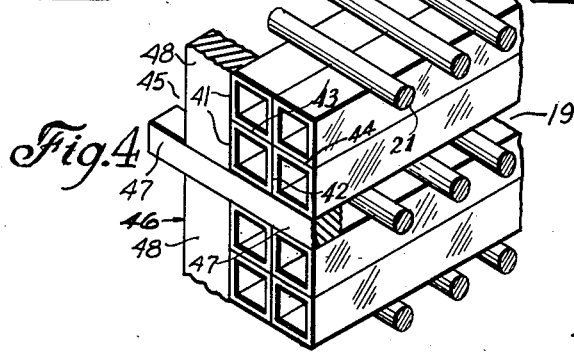
INVENTOR.
Arthur Jensen
BY
ATTORNEY Patented July 1, 1952

2,601,973

UNITED STATES PATENT OFFICE 2,601,973

LAYERED ELEMENT FOR HEAT TRANSFER CORES

Arthur Jensen, Wellsville, N. Y., assignor to The Air Preheater Corporation, New York, N. Y.

Application June 25, 1949, Serial No. 101,392

1 Claim. (Cl. 257—245)

The present invention relates to heat exchange apparatus and particularly to a novel constructional arrangement and method of forming an envelope type of heat transfer core provided with extended surface or fins.

The invention contemplates the provision of a heat transfer core having alternate parallel passages for flow of a heating fluid in intercalated relation with other passages for crosswise or transverse flow of the fluid to be heated. The passages for the heating fluid are essentially of the so called envelope or plate type but are each made up of a series of square or rectangular tubes which are superimposed in a tier and bonded together to form the envelope passage for the fluid to be heated while the space between adjacent envelopes constitutes the passage for the heating fluid. The fin surface is provided in this construction by alternating layers of rectangular tubes in spaced relation with layers of transversely extending wires which are ultimately bonded to and between the superimposed tube components of an envelope. The invention will be best understood upon consideration of the following detailed description of illustrative embodiments thereof when read in conjunction with the accompanying drawings in which:

Figure 1 is a perspective view of part of a heat exchange core constructed in accordance with the present invention.

Figure 2 is a fragmentary detailed view of a modified construction; and Figure 3 is a corresponding side view.

Figure 4 is a detailed view of a further modified construction.

In Figure 1 there is shown a rectangular heat exchanger core having a casing 10 with a manifold or header 15 at one end for supplying the fluid to be heated to the envelopes 12 providing passages extending in parallel relation through the core in alternation with the passages 18 for the heating fluid, which last passages are constituted by the spaces between the envelopes 12. Bars 17 close the ends of the gas passages 18 in the core on the air side, being located between the envelopes 12 so as to seal off the gas passages 18 from communication with the air distributing header 15. Gas is supplied to the open ends of the passages 18 through an inlet manifold 11. This construction is conventional except for the fact that the envelopes 12 are made up of a plurality of superimposed rectangular tube components 13 provided with pin-like fins extending into the gas passages 18.

However, this type of structure is assembled in a novel way consisting in disposing a plurality of square or rectangular tubes 20 in spaced parallel relation to form a row having as many tubes therein as it is desired to form envelopes. After a layer of tubes has been laid down a plurality of wires 21 are laid across them in spaced parallel relation after which a second layer of tubes 13 is disposed upon the wires surmounting the tubes of the first layer. With wires 21 in between tubes the process continues with alternate layers of tubes and wires until sufficient have been assembled for the size of the heat exchange core that is to be produced. In order that the end portions of the tubes 13 may be seated in slots formed between the side closures 17 for the gas passages 18 the wires 21 are not laid across the tubes near their ends. The ends of the tubes are swaged at 14 so that the confronting faces of the tubes 13 which are superposed to form a tier or envelope are in contact. This arrangement closes off the ends of the spaces 19 between these tubes without employing transverse closure bars located between the layers of tubes. It will be apparent that at the manifold ends of the core one might utilize header plates formed with parallel slots to accommodate the tiers of tubes forming the envelopes instead of utilizing the bars 17 as illustrated. After assembly of the tubes 20, wires 21 and end bars 17, or alternative header plates, the entire assemblage is clamped together and brazed to produce a monolithic core structure.

The construction illustrated in Figures 2 and 3 has square tubes 20 whose opposite walls are formed with corrugations or indentations 31 to receive the wires 21. With this construction the opposed faces of the tubes 30 are in full contacting relation and the wires 21 extend from their sides into the gas passages 18.

In Figure 4 each envelope is constructed of superimposed units each comprising four tubes 41 so that the contacting walls 42, 43 of the tubes form internal fins 44 for the square tubular component 13 made up of four tubes. Each group of four tubes considered collectively may have its ends swaged into contact with the contiguous groups of four tubes of the same envelope, as occurs with the single tubes in Figure 1. Alternatively, the four tubes may fit as a group into an opening 45 in end plates 46 as is common in tubular heaters. Thus, the plate ligaments 47 between openings for mounting tubes close the ends of the spaces 19 between superposed groups of tubes and the ligaments 48 close the spaces at the ends of the gas passages 18 located between the tiers of tubes forming adjacent envelopes.

What I claim is:

A plate type heat exchanger having hollow metallic envelopes providing passages for air or other fluid to be heated with the envelopes disposed in spaced parallel relation to form between them passages for the heating fluid such as gas, wherein each envelope comprises a tier of transversely corrugated quadrangular tubular elements superimposed in contacting relation with corresponding tubular elements of adjacent envelopes aligned to form layers or rows; metallic wires disposed between the corrugations of tubular elements in adjacent rows with portions of the wires extending across the spaces between tiers of tubular elements to form extended surface therefor located in the passages for the heating fluid; and inlet and outlet headers connecting with the ends of said tubular elements.

ARTHUR JENSEN.

REFERENCES CITED

The following references are of record in the file of this patent:

UNITED STATES PATENTS

| Number | Name | Date |
| --- | --- | --- |
| 1,648,511 | Solomiac | Nov. 8, 1927 |
| 1,734,274 | Schubart | Nov. 5, 1929 |
| 1,821,765 | Newman | Sept. 1, 1931 |
| 1,863,586 | Wilke | June 21, 1932 |
| 2,198,671 | Kulka | Apr. 30, 1940 |